US007697226B2

(12) United States Patent
Abe et al.

(10) Patent No.: US 7,697,226 B2
(45) Date of Patent: Apr. 13, 2010

(54) CONTROL APPARATUS, STORAGE APPARATUS, AND COMPUTER PRODUCT

(75) Inventors: Yukio Abe, Kawasaki (JP); Takahiro Aoki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 485 days.

(21) Appl. No.: 11/701,259

(22) Filed: Feb. 1, 2007

(65) Prior Publication Data

US 2008/0055761 A1 Mar. 6, 2008

(30) Foreign Application Priority Data

Aug. 29, 2006 (JP) .............................. 2006-232319

(51) Int. Cl.
*G11B 5/09* (2006.01)

(52) U.S. Cl. ............................... 360/53; 360/31; 360/60

(58) Field of Classification Search ....................... None
See application file for complete search history.

(56) References Cited

U.S. PATENT DOCUMENTS

| 6,809,893 B2 * | 10/2004 | Uzumaki et al. ............... 360/31 |
| 6,975,467 B1 * | 12/2005 | Lewkowicz et al. ........... 360/31 |
| 7,174,478 B2 * | 2/2007 | Asano ........................... 714/8 |

FOREIGN PATENT DOCUMENTS

| JP | 05-020789 | 1/1993 |
| JP | 06-052636 | 2/1994 |
| JP | 2001-014606 | 1/2001 |
| JP | 2004-047023 | 2/2004 |

* cited by examiner

*Primary Examiner*—Jason C Olson
(74) *Attorney, Agent, or Firm*—Greer, Burns & Crain, Ltd.

(57) ABSTRACT

A rewrite determining unit acquires, for every servo frame recorded on a magnetic disk, an amplification degree, i.e., a gain of an amplifier circuit by which a read signal read from the magnetic disk is amplified to a predetermined output, determines a rewrite sector count based on the amplification degree, and performs data rewriting according to the rewrite sector count.

6 Claims, 6 Drawing Sheets

CONTROL APPARATUS, STORAGE APPARATUS, AND COMPUTER PRODUCT

BACKGROUND OF THE INVENTION

1. Field of the Invention

The present invention relates to a data rewriting technique, and particularly relates to data rewriting control when a write fault occurs.

2. Description of the Related Art

In a conventional magnetic disk apparatus, if a write fault occurs while data is being written, data is rewritten in a predetermined number of sectors located before the sector where the write fault has occurred. A conventional technology has been disclosed, for example, in Japanese Patent Application Laid-open No. H5-207789.

The reason for rewriting the data in the sectors located before the sector where the write fault occurs is as follows. Due to intermittent nature of servo sampling for detecting an offtrack position, if a write fault occurs due to the offtrack position or the like, it is probable that data in sectors between a previous servo frame (where it is assumed that data is written at a normal track position) of a servo frame where the offtrack position is detected and a servo frame where the offtrack position is detected is written offtrack. Therefore, it is necessary to rewrite the data in the sectors between the two servo frames to a center of a track. Thus, the number of sectors in which data is to be rewritten should include the sector including the servo frame where the write fault is detected.

Generally, a magnetic disk is divided into zones from an outer periphery to an inner periphery to increase a recording density of the magnetic disk. The number of sectors varies in every track from the outermost track to the innermost track in a zone. However, the number of servo frames of all the tracks in a zone is the same to keep the servo sampling constant.

More sectors are present between any two servo frames towards the outer periphery, and smaller sectors are present between any two servo frames towards the inner periphery. However, the maximum number of sectors between two frames in the outermost track is generally set as a fixed value for the number of sectors in which the data is to be rewritten.

However, in the conventional technology, the rewrite sector count is determined based on a variation in the head in a radial direction, that is, an offtrack amount without taking into account a variation in a levitation amount of the head, that is, a movement of the head in a vertical direction. Consequently, the writing process is completed with unstably written data recorded on the magnetic disk.

Thus, the rewrite sector count possibly only covers those areas where the variation in the head movement takes place in the radial direction and not those areas where the variation in the head movement takes place in the vertical direction. As a result, if a reading process for reading the data thus written is to be performed in the future, the reading process can become unstable.

In other words, it is imperative to rewrite data in sectors with unstably written data by taking into account the levitation amount of the head in addition the offtrack amount. Particularly, the magnetic disk apparatus installed in a portable apparatus (such as a portable data tool or a portable music player) likely to be carried on a train, plane or when walking, or during hiking, etc, is constantly at risk of being subjected to continuous jolts. The magnetic disk apparatus is easily affected by the usage environment of the portable device. It is, therefore, essential to ensure successful rewriting of data in the magnetic disk apparatus.

SUMMARY OF THE INVENTION

It is an object of the present invention to at least partially solve the problems in the conventional technology.

According to an aspect of the present invention, a control apparatus that controls a storage apparatus to rewrite data when a write fault occurs while the data is being written to a storage medium included in the storage apparatus includes an amplification-degree detecting unit that detects an amplification degree by which a read signal read from each of a plurality of servo frames recorded on the storage medium is amplified to a predetermined output level; and a rewrite determining unit that determines whether to rewrite the data to the storage medium based on the amplification degree.

According to another aspect of the present invention, a storage apparatus that rewrites data when a write fault occurs while the data is being written to a storage medium included in the storage apparatus includes an amplification-degree detecting unit that detects an amplification degree by which a read signal read from each of a plurality of servo frames recorded on the storage medium is amplified to a predetermined output level; and a rewrite determining unit that determines whether to rewrite the data to the storage medium based on the amplification degree.

According to still another aspect of the present invention, a computer-readable recording medium that stores therein a computer program that causes a computer to rewrite data when a write fault occurs while the data is being written to a storage medium included in a storage apparatus, the computer program causing the computer to execute detecting an amplification degree by which a read signal read from each of a plurality of servo frames recorded on the storage medium is amplified to a predetermined output level; and determining whether to rewrite the data to the storage medium based on the amplification degree.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
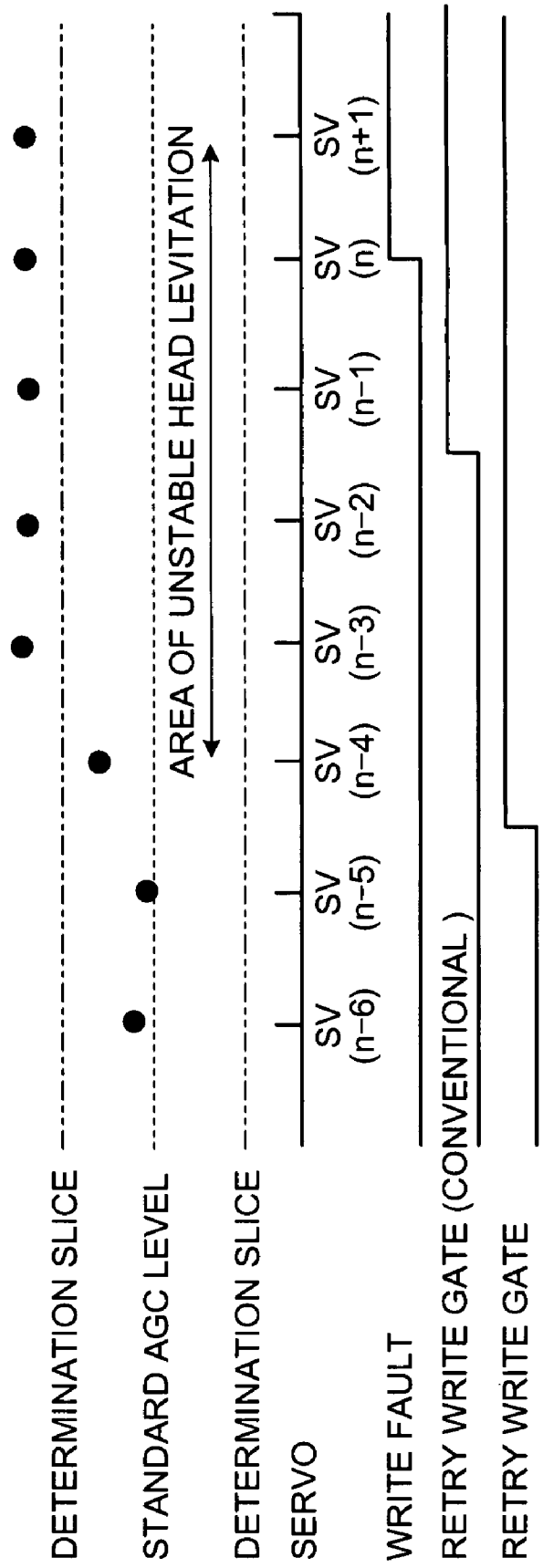
FIG. 1 is a schematic for explaining an overview and a salient feature of a magnetic disk apparatus according to an embodiment of the present invention.

Exemplary embodiments of the magnetic disk apparatus of the present invention are described below with reference to the accompanying drawings. FIG. 1 is a schematic for explaining an overview and a salient feature of the magnetic disk apparatus according to an embodiment of the present invention. It is assumed that a write fault occurs at a servo frame SV(n). A solid dot in FIG. 1 represents an amplification degree (amplification of a read signal read from a magnetic disk to a predetermined output level) corresponding to each servo frame. A levitation amount of a head is unstable in the area where the amplification degree outreaches an end of a determination slice.

According to conventional technology, the rewrite sector count is determined, and rewriting is performed based on the rewrite sector count. In the example shown in FIG. 1, data is rewritten from a point midway between servo frames SV(n−2) and SV(n−1).

In other words, in the conventional technology, the rewrite sector count is fixed. Due to this, the sectors with unstably written data (the area covering the servo frames SV(n−1) to SV(n−4) in FIG. 1, the area varying depending on various conditions) because of instability of the head in the vertical direction (head levitation) are not addressed and data in these sectors are not rewritten, thus completing the writing process with unstably written data recorded on the magnetic disk.

However, in the magnetic disk apparatus according to the embodiment, the rewrite sector count is determined based on the amplification degree corresponding to each servo frame, and rewriting is performed according to the rewrite sector count. In the example shown in FIG. 1, rewriting is performed starting somewhere between the servo frames SV(n−5) and SV(n−4).

Thus, when a write fault occurs when data is being written to the magnetic disk, the magnetic disk apparatus according to the embodiment detects, for every servo frame recorded on the magnetic disk, the amplification degree (the gain of the amplifier circuit 140) by which the read signal read from the magnetic disk is amplified to the predetermined output level, determines the rewrite sector count based on the amplification degree, and performs rewriting according to the rewrite sector count. Consequently, it is possible to ensure that the data is rewritten in sectors (areas) where data is not written correctly.

Furthermore, because data is faultlessly rewritten in the all the sectors where data is not written correctly, a future read fault can be prevented.

Figure 2:
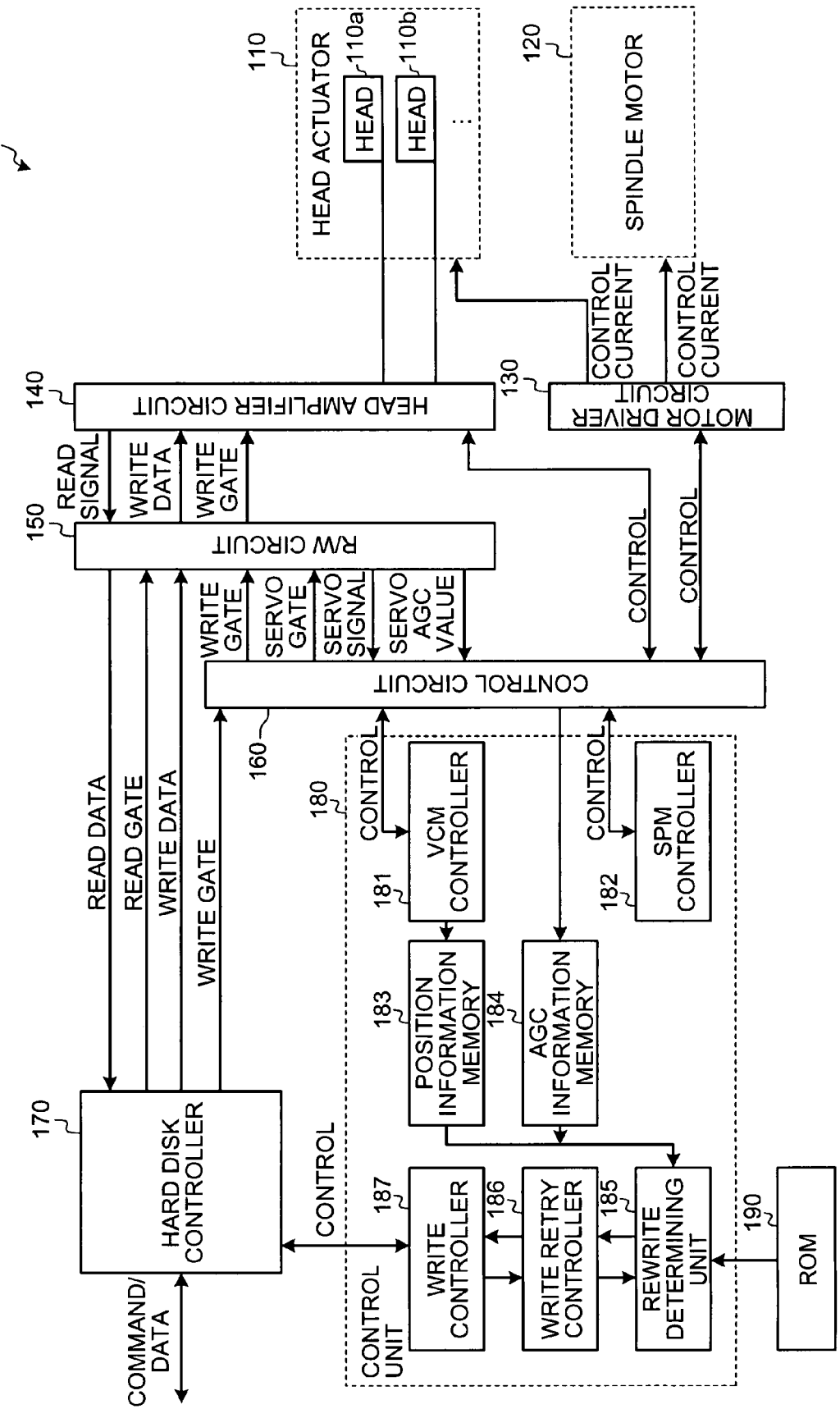
FIG. 2 is a functional block diagram of the magnetic disk apparatus shown in FIG. 1.

A configuration of a magnetic disk apparatus 100 according to the embodiment will be explained with reference to a functional block diagram shown in FIG. 2. The magnetic disk apparatus 100 includes a head actuator 110, a spindle motor 120, a motor driver circuit 130, a head amplifier circuit 140, a read/write (R/W) circuit 150, a control circuit 160, a hard disk controller 170, a control unit 180, and a read-only memory (ROM) 190.

The head actuator 110 actuates, i.e., "moves" heads 110a and 110b by a control current output from the motor driver circuit 130. Only two heads 110a and 110b are shown in FIG. 1 for the sake of convenience; however, generally there may be more than two heads.

The spindle motor 120 performs rotation control of the magnetic disk by a control current output from the motor driver circuit 130. The motor driver circuit 136 acquires a control instruction output from the control circuit 160 and outputs the control current to the head actuator 110 and the spindle motor 120 based on the control instruction.

The head amplifier circuit 140 acquires a control instruction from the control circuit 160, and also acquires write data (data to be written onto the magnetic disk) and write gate, i.e., data indicating a write timing for writing the data onto the magnetic disk from the R/W circuit 150. The head amplifier circuit 140 then writes the write data onto the magnetic disk via the head 110a or 110b. Moreover, the head amplifier circuit 140 acquires a read signal, i.e., data read from the magnetic disk via the head 110a or 110b and outputs the read signal to the R/W circuit 150.

The R/W circuit 150 performs various processes related to reading of data from and writing of data to the magnetic disk. Specifically, the R/W circuit 150 creates read data (having a constant output level) by amplifying the read signal output from the head amplifier circuit 140 and outputs the read data to the hard disk controller 170 according to read gate, i.e., data indicating a read timing for reading data from the magnetic disk output from the head disk controller 170. In addition, the R/W circuit 150 outputs the write data output from the hard disk controller 170 and the write gate output from the control circuit 160 to the head amplifier circuit 140.

Further, the R/W circuit 150 acquires servo gate, i.e., data indicating a read timing for reading a servo signal from the magnetic disk from, the control circuit 160 and outputs the servo signal to the control circuit 160. Though not shown in FIG. 2, the R/W circuit 150 acquires the servo signal via the head 110a or 110b and the head amplifier circuit 140 and outputs the servo signal to the control circuit 160. The servo signal contains information on the offtrack amount that indicates the amount of shift of the head 110a or 110b from the center of the track on the magnetic disk for each servo frame.

The R/W circuit 150 also outputs an amplification degree (a gain of the R/W circuit 150), by which each read signal is amplified, as a servo automatic gain control (AGC) value to the control circuit 160. The R/W circuit 150 adjusts the amplification degree so that the output level of the read data is maintained constant. Consequently, the R/W circuit 150 outputs a larger servo AGC value as the read signal gets smaller, and vice versa. As explained with reference to FIG. 1, the area where a servo automatic gain control (AGC) value overshoots the determination slice is taken the area where the levitation amount of the head is considered to be unstable.

The control circuit 160 controls the motor driver circuit 130 and the head amplifier circuit 140 according to the control instruction from the control unit 180. The control circuit 160 acquires the write gate from the hard disk controller 170 and outputs the write gate to the R/W circuit 150. The control circuit 160 also outputs the servo gate to the R/W circuit 150, acquires the servo signal and the servo AGC value from the R/W circuit 150, and outputs the servo signal and the servo AGC value to the control unit 180.

The hard disk controller 170 receives various types of data/commands from a host computer, which is not shown, or from the control unit 180, and controls the entire magnetic disk apparatus 100 accordingly. In particular relevance to the present invention, in response to a write command from the host computer, the hard disk controller 170 outputs the write gate to the control circuit 160 and the write data to the R/W circuit 150. Similarly, in response to a read command from the host computer, the hard disk controller 170 outputs the read gate to the R/W circuit 150 and the read data acquired from the R/W circuit to the host computer.

Further, in response to a write retry command from the control unit 180, the hard disk controller 170 outputs to the R/W circuit 150 the write data to be rewritten to the sectors on the magnetic disk determined by the control unit 180, and outputs the write gate to the control circuit 160.

The control unit 180 has an internal memory for storing therein various types of control data and uses the data to perform various processes. In particular relevance to the present invention, the control unit 180, as shown in FIG. 2, includes a voice coil motor (VCM) controller 181, a spindle motor (SPM) controller 182, a position information memory

183, an AGC information memory 184, a rewrite determining unit 185, a write retry controller 186, and a write controller 187.

The VCM controller 181 acquires the servo signal from the control circuit 160, and outputs, based on the servo signal, a control instruction to the control circuit 160 to move the head 110a or 110b to the track on the magnetic disk from which data is to be read or to which data is to be written. The VCM controller 181 stores the servo signal acquired from the control circuit 160 in the position information memory 183.

The SPM controller 182 outputs to the control circuit 160 a control instruction for adjusting the number of rotations of the spindle motor 120. The position information memory 183 stores therein the servo signal that contains the offtrack amount for every servo frame. The servo signal is stored in the position information memory 183 by the VCM controller 181. The AGC information memory 184 stores therein the servo AGC value output from the control circuit 160 for every servo frame.

The rewrite determining unit 185 determines whether data is to be rewritten based on the servo signal stored in the position information memory 183, and if data is to rewritten, determines the rewrite sector count based on the servo signal and the servo AGC value stored in an AGC information memory 184.

Further, the rewrite determining unit 185 performs a first determination process, a second determination process, and a third determination process. In the first determination process, the rewrite determining unit 185 determines the rewrite sector count based on the offtrack amount of every servo frame. In the second determination process, the rewrite determining unit 185 determines the rewrite sector count when the offtrack amount at the next servo frame in the path of the head is estimated and the writing process stops. In the third determination process, the rewrite determining unit 185 determines the rewrite sector count based on the servo AGC value. The rewrite determining unit 185 then compares the results of the first, second, and third determination processes, and selects the highest rewrite sector count as the rewrite sector count. The first, second, and third determination processes are described below in detail.

Figure 3:
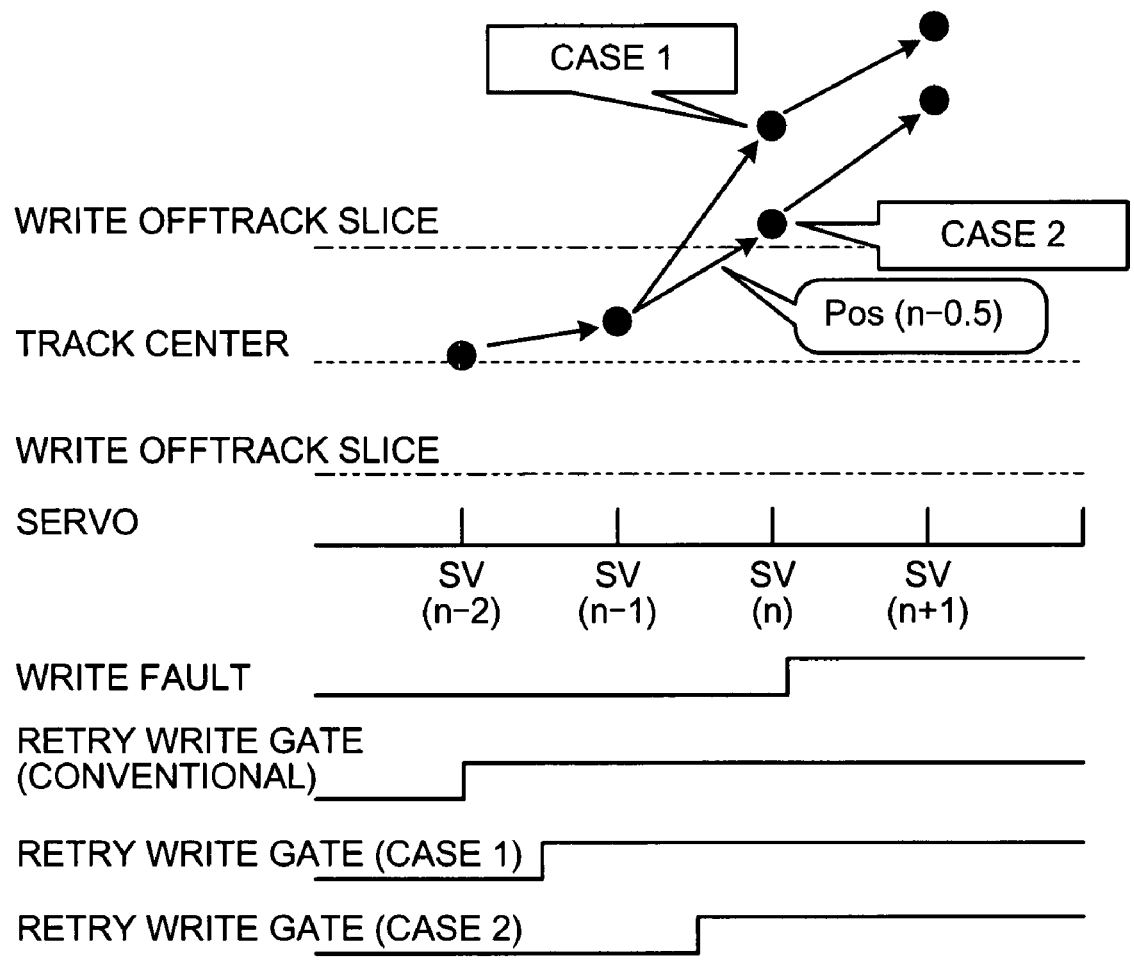
FIG. 3 is a schematic for explaining a first determination process.

FIG. 3 is a schematic for explaining the first determination process. The rewrite determining unit 185 acquires the servo signal stored in the position information memory 183 and determines for every servo frame whether the offtrack amount is equal to or greater than a first stipulated value. It is to be noted that the first stipulated value is defined as a distance between the track center and one end of the write offtrack slice in FIGS. 1, 3 and 4. The rewrite determining unit 185 determines that the data is to be rewritten if the offtrack amount is equal to or greater than the stipulated value.

After determining that the data is to rewritten, the rewrite determining unit 185 determines the rewrite sector count. The example in FIG. 3 depicts a case of the offtrack amount exceeding the first stipulated value at the servo frame SV(n), indicating that a write fault has occurred at the servo frame SV(n).

In Case 1 shown in FIG. 3, the offtrack amount at the servo frame SV(n) has grossly exceeded the first stipulated value, the rewrite determining unit 185 determines that data needs to be rewritten in the sectors that include the servo frame SV(n−1), that is, all the sectors between the servo frames SV(n−1) and SV(n). Let us assume that the rewrite determining unit 185 determines that the rewrite sector count is five.

In Case 2 shown in FIG. 3, the offtrack amount at the servo frame SV(n) has only marginally exceeded the first stipulated value. This indicates that the offtrack amount immediately after the servo frame SV(n−1) is negligible, and there is no need to rewrite data in the sectors immediately after the servo frame SV(n−1). Thus, in Case 2, the rewrite determining unit 185 determines that it is necessary to rewrite data in not all but only some of the sectors between the servo frames SV(n−1) and SV(n). For example, the rewrite determining unit 185 determines that it is necessary to rewrite data in only four out of the five sectors between the servo frames SV(n−1) and SV(n).

A method of classifying a write fault as Case 1 or Case 2 is explained below. The rewrite determining unit 185 sets the offtrack amount at the servo track SV(n) as Pos(n) and calculates, by linear interpolation, an offtrack amount halfway between the servo tracks SV(n−1) and SV(n) as Pos(n−0.5). The rewrite determining unit 185 classifies the write fault as Case 1 or Case 2 based on the offtrack amount calculated by the linear interpolation.

An equation for calculating the Pos(n−0.5) by the linear interpolation is Pos(n−0.5)=(Pos(n)−Pos(n−1)/2)+Pos(n−1)).

If the value of Pos(n−0.5) is equal to or greater than the first stipulated value, the rewrite determining unit 185 takes it indicating that the offtrack amount of the data written immediately after the servo track SV(n−1) is large, and hence classifies the write fault as Case 1.

If the value of Pos(n−0.5) is smaller than the first stipulated value, the rewrite determining unit 185 takes it indicating that the offtrack amount of the data written immediately after the servo track SV(n−1) is small, and hence classifies the write fault as Case 2.

Figure 4:
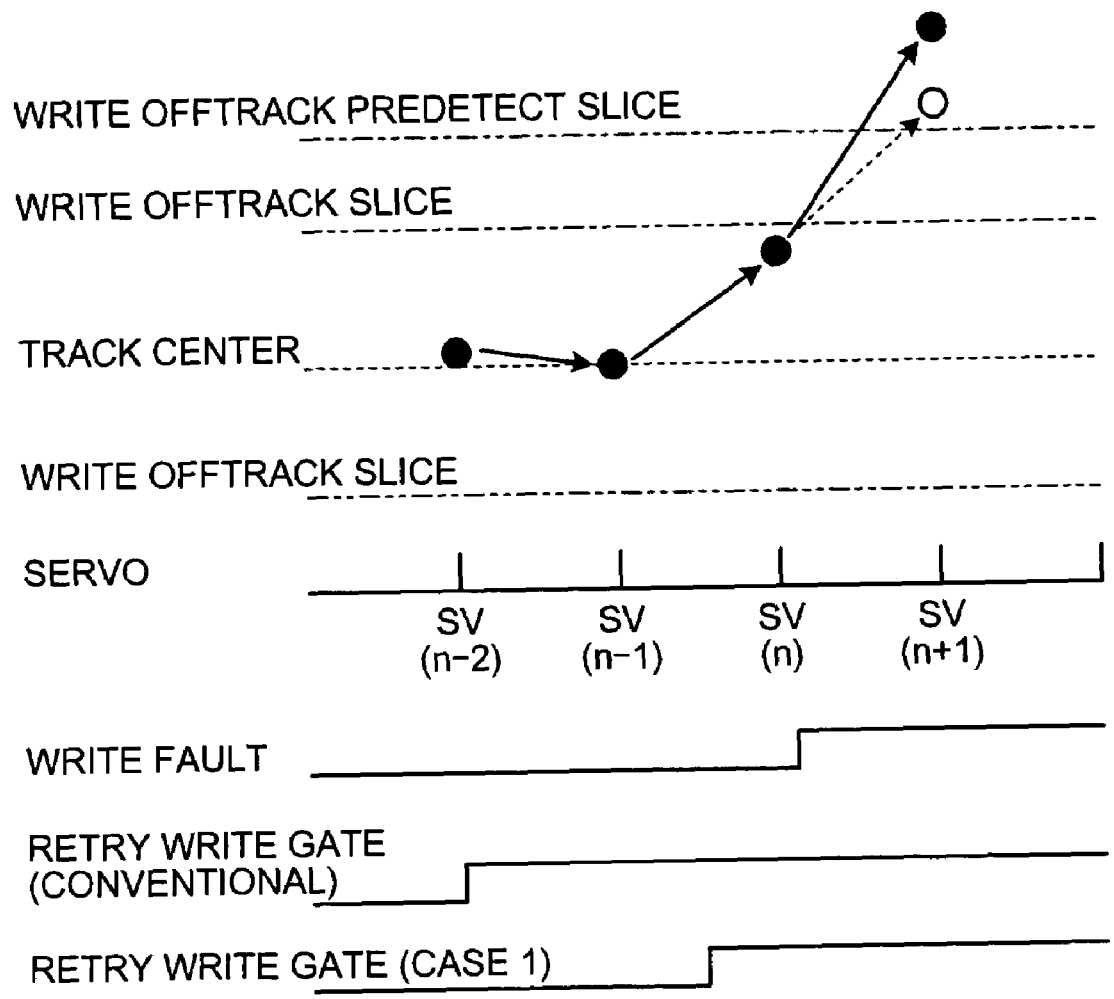
FIG. 4 is a schematic for explaining a second determination process.

The second determination process is described below. FIG. 4 is a schematic for explaining the second determination process. In the second determination process, the rewrite determining unit 185 calculates, i.e., 'estimates' an offtrack amount at the next servo frame based on the servo signal recorded in the position information memory 183, and determines whether the calculated offtrack amount is greater than a second stipulated value. It is to be noted that the second stipulated value is defined as a distance between the track center and an end of a write offtrack predetect slice in FIG. 4. If the offtrack amount is greater than the stipulated value, the writing process stops and the rewrite determining unit 185 determines that data rewriting should be performed.

If SV(n) is the current servo frame, the servo frame at which an offtrack amount is to be estimated would be SV(n+1). An equation used for calculating the offtrack amount at the next servo frame can, for instance, be SV(n+1)=SV(n)+(SV(n)−SV(n−1)).

If determining in the second determination process that rewriting is to be performed, the rewrite determining unit 185 determines rewriting is to be performed beginning from a sector in which data is written immediately after the current servo frame. If the current servo frame is SV(n), the rewrite determining unit 185 determines that rewriting should be performed from the sector immediately after the servo frame SV(n). Let us assume that the rewrite determining unit 185 determines that the rewrite sector count is two or one.

Apart from using the equation, an estimate can be made of the head position by an observer for estimating the offtrack amount at the next servo frame, after which it can be determined whether rewriting is to be performed.

The third determination process is explained below with reference to FIG. 1. In the third determination process, the rewrite determining unit 185 acquires the servo signal stored in the position information memory 183 and determines whether the offtrack amount is equal to or greater than the first stipulated value. The rewrite determining unit 185 determines that rewriting is to be performed if the offtrack amount is equal to or greater than the first stipulated value.

Upon determining that rewriting is to be performed, the rewrite determining unit 185 determines the rewrite sector count based on the servo AGC value stored in the AGC information memory 184. As shown in FIG. 1, the rewrite determining unit 185 determines a servo frame, i.e., servo frame SV(n−4) whose servo AGC value is equal to or smaller than a third stipulated value defined as the determination slice shown in FIG. 1.

The rewrite determining unit 185 then determines the rewrite sector count to include at least the servo frame whose servo AGC value is equal to or smaller than the third stipulated value. The rewrite sector count N, for instance, is calculated by an equation N=(T1−T2)*A+C..., where T1 is the number of the servo frame at which a write fault has occurred, i.e., the number of the servo frame SV(n) in the example shown in FIG. 1, T2 is the number of the servo frame whose servo AGC is equal to or smaller than the third stipulated value, i.e., the number of the servo frame SV(n−4), A is the number of sectors between two servo frames, and C is a constant. The equation given above is only an example. The constant C can be omitted.

Apart from determining the rewrite sector count using the first and second determination processes when a write fault occurs, the rewrite determining unit 185 also determines the rewrite sector count based on the cause for interruption to the writing process. The rewrite determining unit 185, for example, determines the cause of the write fault based on a shock signal output from the shock sensor when the magnetic disk apparatus 100 receives a jolt, or circuit information regarding a fault in a circuit such as amplifier information that indicates any fault in the head amplifier circuit 140, and determines the rewrite sector count based on the cause of the write fault. For example, if the magnetic disk apparatus 100 receives a jolt and the head amplifier circuit 140 thereby malfunctions, that is, if the write fault is caused by a jolt to the magnetic disk apparatus 100 as well as a malfunctioning of head amplifier circuit 140, the rewrite determining unit 185 determines that data in two sectors needs to be rewritten. However, if only one condition occurs, that is, either the magnetic disk apparatus 100 receives a jolt or the head amplifier circuit 140 malfunctions, the rewrite determining unit 185 determines that data in one sector needs to be rewritten.

Thus, the rewrite sector count can be determined more accurately by determining the cause of the write fault garnered from the shock signal from the shock sensor and amplifier information from the head amplifier circuit 140.

Returning to FIG. 2, the write retry controller 186 inquires the rewrite determining unit 185 whether rewriting is to be performed. If the rewrite determining unit 185 determines that rewriting is to be performed, the write retry controller 186 acquires from the rewrite determining unit 185 the rewrite sector count and outputs the rewrite sector count as a retry condition to the write controller 187.

The write controller 187 outputs the retry condition to the hard disk controller 170 during the rewriting process, enabling write retry to take place. Specifically, when the write retry controller 186 outputs the inquiry regarding whether rewriting is to be performed to the rewrite determining unit 185 and the write controller 187 acquires the retry condition from the write retry controller 186, the write controller 187 determines that write retry is to be performed and outputs the retry condition to the hard disk controller 170.

The ROM 190 stores therein the data and programs required by the control unit 180 for performing various processes.

Figure 5:
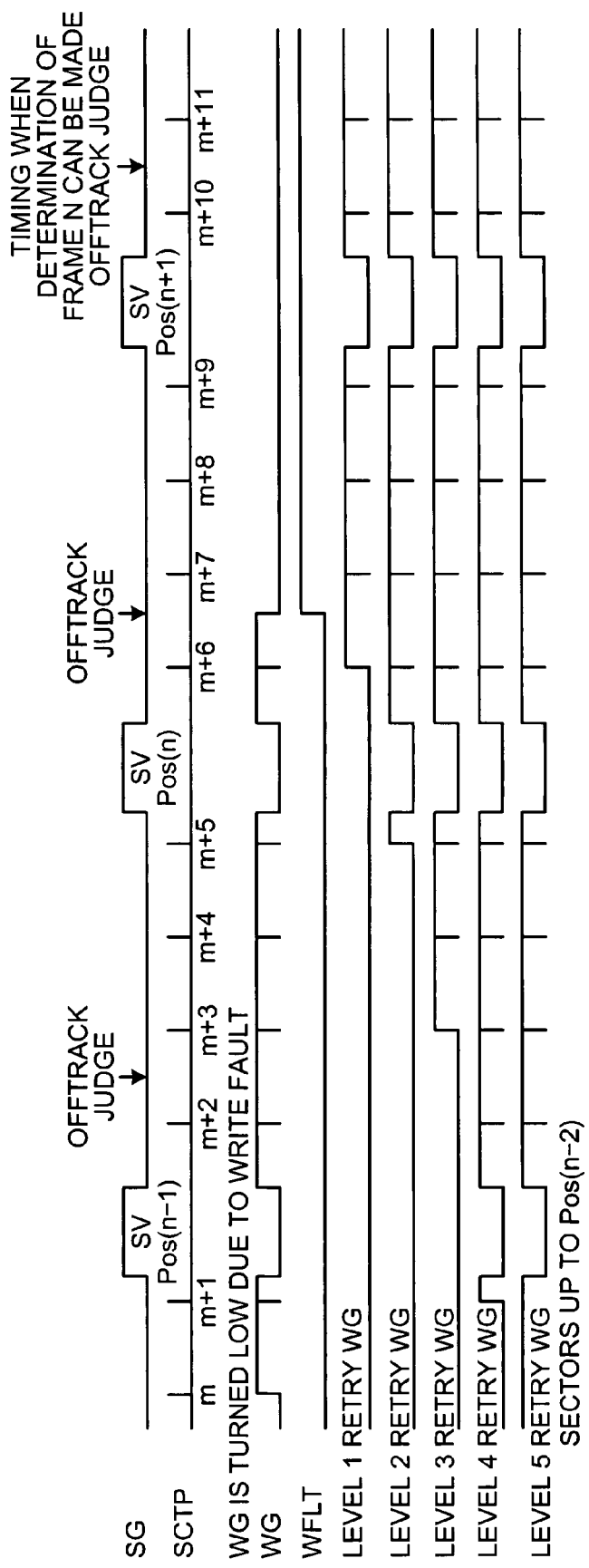
FIG. 5 is an example of write gate and timings of servo frames for different rewrite sector counts.

FIG. 5 is an example of the write gate and the timings of the servo frames for different rewrite sector counts. Symbol SG in the first row in FIG. 5 indicates the servo gate, and when the value of the servo gate is high, the head is on the servo frame. A timing of the SG labeled Offtrack judge is when it is determined whether a write fault has occurred. When the SG is high, it acts as a trigger for the Offtrack judge to be performed.

Symbol SCTP in the second row in FIG. 5 indicates the sectors on the magnetic disk. Symbol WG in the third row indicates the write gate. Symbol WFLT in the fourth row indicates the timing of the write fault. In the example shown in FIG. 5, the write fault occurs between SCTP m+6 and m+7.

Level 1 retry WG to Level 5 retry WG in FIG. 5 indicate write gate signals for the respective rewrite sector counts. Level 1 retry WG is the write gate signal when the rewrite sector count is one, and in the example shown in FIG. 5, rewriting is performed from SCTP m+6. Level 2 retry WG is the write gate signal when the rewrite sector count is two, and in FIG. 5, rewriting is performed from SCTP m+5. Level 3 retry WG is the write gate signal when the rewrite sector count is four, and in FIG. 5, rewriting is performed from SCTP m+3.

Level 4 retry WG is the write gate signal when the rewrite sector count is five, and in FIG. 5, rewriting is performed from SCTP m+1. Level 5 retry WG is the write gate signal when the sectors to be rewritten start immediately after Pos(n−2).

The magnetic disk apparatus 100 performs rewriting using the level 4 retry WG signal if the rewrite determining unit 185 determines in the first determination process that the write fault falls under Case 1. The magnetic disk apparatus 100 performs rewriting using the level 3 retry WG signal if the rewrite determining unit 185 determines that the write fault falls under Case 2.

The magnetic disk apparatus 100 performs rewriting using the level 2 retry WG or the level 1 retry WG if the rewrite determining unit 185 determines in the second determination process that rewriting is to be performed.

The magnetic disk apparatus 100 adjusts a duration for which the retry WG remains 'high' to correspond to the sector count determined by the rewrite determining unit 185 if the rewrite determining unit 185 determines in the third determination process that rewriting is to be performed.

The conventional magnetic disk apparatus always performs rewriting using either the level 4 retry WG or the level 5 retry WG. However, in the magnetic disk apparatus according to the embodiment of the present invention, the rewrite sector count varies according to circumstances. Therefore, sectors in which data does not need to be rewritten are left alone, preventing performance deterioration of the magnetic disk apparatus 100.

Because the duration for which the retry WG remains high is adjusted taking into account the variation in the levitation amount of the head, the possibility of leaving data written in an unstable manner unaddressed is eliminated.

Figure 6:
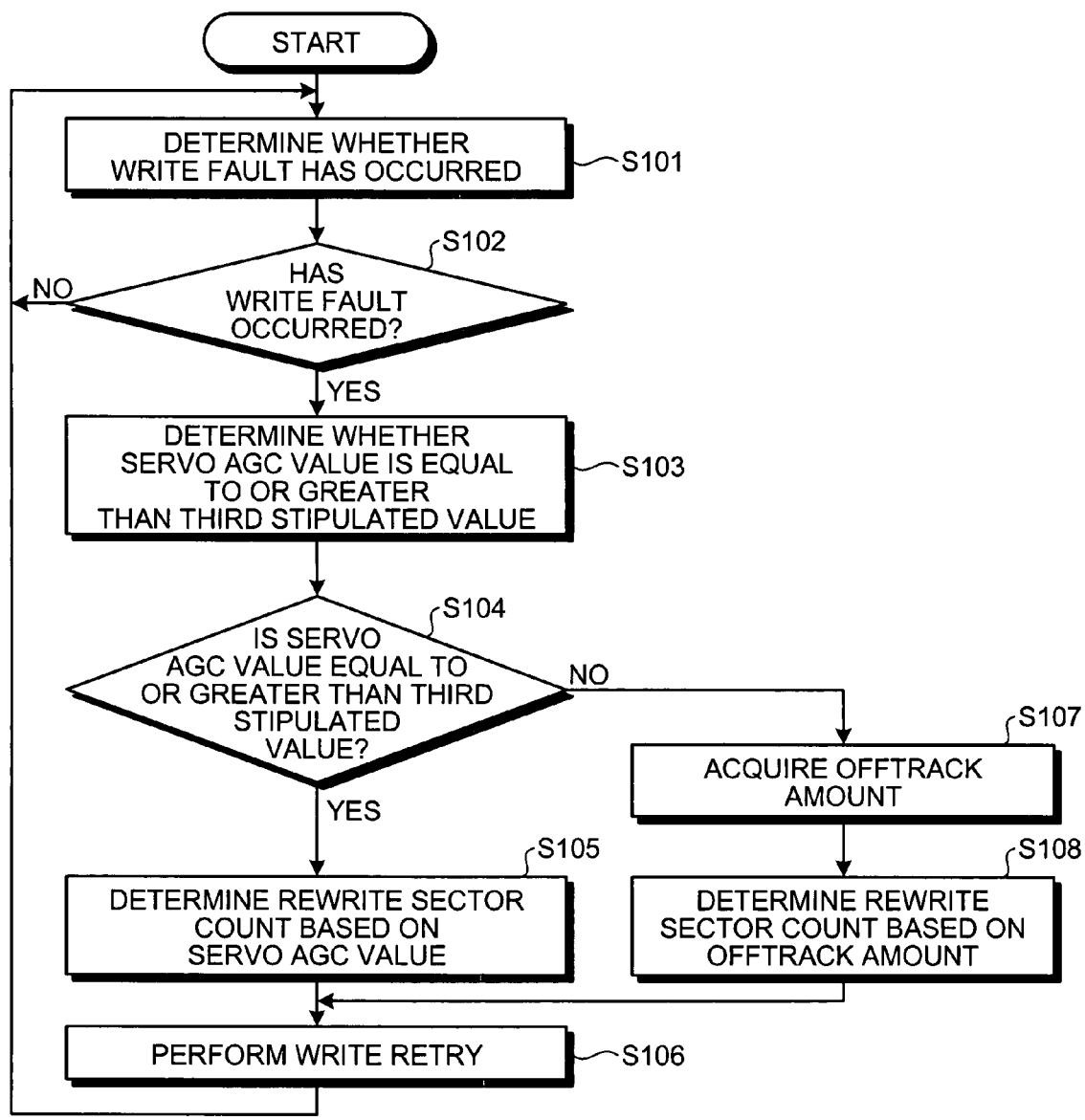
FIG. 6 is a flowchart of a process procedure performed by the magnetic disk apparatus for determining the rewrite sector count.

A process procedure of the magnetic disk apparatus 100 for determining the rewrite sector count is explained below with reference to FIG. 6. The rewrite determining unit 185 of the magnetic disk apparatus 100 acquires the servo signal from the position information memory 183 and determines if a write fault has occurred (step S101). If no write fault has occurred (No at step S102), the rewrite determining unit 185 repeats step S101.

If a write fault occurs (Yes at step S102), the rewrite determining unit 185 acquires the servo AGC value from the AGC information memory 184 and determines whether the servo AGC value is equal to or greater than the third stipulated value (step S103).

If the servo AGC value is equal to or greater than the third stipulated value (Yes at step S104), the rewrite determining unit 185 determines the rewrite sector count based on the servo AGC value (step S105). The write controller 187 acquires the rewrite sector count from the rewrite determining unit 185 via the write retry controller 186, and performs write retry (step S106).

If the servo AGC value is smaller than the third stipulated value (No at step S104), the rewrite determining unit 185 acquires the offtrack amount corresponding to each servo frame from the position information memory 183 (step S107), determines the rewrite sector count (step S108), and returns to the step S106.

The rewrite determining unit 185 performs either the first determination process or the second determination process at the step S108 to determine the rewrite sector count.

In the rewrite sector count determining process explained with reference to FIG. 6, the rewrite determining unit 185 performs either the first determination process, or the second determination, or the third determination process. However, the rewrite determining unit 185 can be configured to perform all the three determination processes sequentially, and select the highest of the rewrite sector counts as the rewrite sector count.

Thus, when a write fault occurs, the rewrite determining unit 185 determines the rewrite sector count and the write controller 187 performs rewriting. Consequently, inclusion of unstably written data in the magnetic disk at the time of completion of the writing process is prevented.

Thus, in the magnetic disk apparatus 100 according to the embodiment, when a write fault occurs while data is being written to a magnetic disk, the rewrite determining unit 185 acquires from the AGC information memory 184 the amplification degree (the gain of the amplifier circuit 140) by which the read signal read from the magnetic disk is amplified to a predetermined output level for every servo frame recorded on the magnetic disk, determines the rewrite sector count based on the amplification degree, and performs data rewriting in accordance with the rewrite sector count. Consequently, data is written to sectors (areas) to which data is not written correctly.

In the magnetic disk apparatus 100 according to the embodiment, data rewriting is performed by taking into consideration the variation of the head in the radial direction in the form of offtrack amount as well as the variation of the head in the vertical direction in the form of levitation amount of the head. Consequently, data can be faultlessly rewritten to the all the sectors having a write fault, and a future read error can be prevented.

The various process explained in the embodiment can be realized by execution of a program prepared in advance by a central processing unit (CPU) (or a micro control unit (MCU) or a micro processing unit (MCU)) provided in the magnetic disk apparatus 100. Programs for executing the various processes shown in FIG. 2 can be stored in the RAM 190, and the processes can be realized by causing the control unit 180 to read the programs from the ROM 190.

The programs need not necessarily be installed in the ROM 190 but can be read by the control unit 180 from a portable physical medium such as flexible disk (FD), compact disk-read-only memory (CD-ROM), digital versatile disk (DVD), a magnetooptical disk or an integrated circuit (IC) card that can be inserted into the host computer. Alternatively, the program can be stored in a non-portable physical medium such as hard disk device (HDD) provided in the host computer internally or externally, or on another computer (or server) connected to the computer over the public line, the Internet, the local area network (LAN), or the wide area network (WAN).

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the embodiment can be, entirely or in part, carried out manually. Similarly, all the manual processes explained in the embodiment can be entirely or in part carried out automatically by a well-known method.

The process procedures, the control procedures, specific names, and data, including various parameters mentioned in the description and drawings can be changed as required unless otherwise specified.

The constituent elements of the apparatus illustrated are merely conceptual and may not necessarily physically resemble the structures shown in the drawings. For example, the apparatus need not necessarily have the structure that is illustrated. The apparatus as a whole or in parts can be distributed or integrated either functionally or physically according to the load or how the apparatus is to be used.

The process functions performed by the apparatus are entirely or partially realized by the CPU or a computer program executed by the CPU or by a hardware using wired logic.

According to an aspect of the present invention, inclusion of unstably written data in the storage medium is prevented when the writing process is completed.

According to another aspect of the present invention, data is rewritten accurately in the areas where data is unstably written due to the variation in the levitation amount of the head.

According to still another aspect of the present invention, data is rewritten more accurately in the areas where data is unstably written.

According to still another aspect of the present invention, inclusion of sectors containing unstably written data at the time of completion of the writing process is prevented. In addition, the rewriting process is performed smoothly. Further, by preventing unstably written data from being included, a read fault can be eliminated, improving the reliability of the magnetic disk apparatus. Reliability can be particularly improved in a portable apparatus that is likely to be carried when traveling and that are likely to receive jolts, be dropped, or be exposed to variations in atmospheric pressure.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus that controls a storage apparatus to rewrite data when a write fault occurs while the data is being written to a storage medium included in the storage apparatus, the control apparatus comprising:

an amplification-degree detecting unit that detects an amplification degree by which a read signal read from each of a plurality of servo frames recorded on the storage medium is amplified to a predetermined output level; and a rewrite determining unit that determines whether to rewrite the data to the storage medium based on the amplification degree, and when it is determined to rewrite the data, determines, as a rewrite sector count, a number of sectors present between a servo frame where the write fault has occurred and a servo frame for which an amplification degree is equal to or smaller than a stipulated value.

2. The control apparatus according to claim 1, further comprising an offtrack-amount detecting unit that detects an offtrack amount indicating an amount of shift of a head of the storage apparatus from a center of a track of the storage medium, wherein the rewrite determining unit determines whether to rewrite the data based on the offtrack amount and the amplification degree.

3. A storage apparatus that rewrites data when a write fault occurs while the data is being written to a storage medium included in the storage apparatus, the storage apparatus comprising:

an amplification-degree detecting unit that detects an amplification degree by which a read signal read from each of a plurality of servo frames recorded on the storage medium is amplified to a predetermined output level; and a rewrite determining unit that determines whether to rewrite the data to the storage medium based on the amplification degree, and when it is determined to rewrite the data, determines, as a rewrite sector count, a number of sectors present between a servo frame where the write fault has occurred and a servo frame for which an amplification degree is equal to or smaller than a stipulated value.

4. The storage apparatus according to claim 3, further including an offtrack-amount detecting unit that detects an offtrack amount indicating an amount of shift of a head of the storage apparatus from a center of a track of the storage medium, wherein the rewrite determining unit determines whether to rewrite the data based on the offtrack amount and the amplification degree.

5. A computer-readable recording medium that stores therein a computer program that causes a computer to rewrite data when a write fault occurs while the data is being written to a storage medium included in a storage apparatus, the computer program causes the computer to execute:

detecting an amplification degree by which a read signal read from each of a plurality of servo frames recorded on the storage medium is amplified to a predetermined output level;

determining whether to rewrite the data to the storage medium based on the amplification degree; and when it is determined to rewrite the data, determining, as a rewrite sector count, a number of sectors present between a servo frame where the write fault has occurred and a servo frame for which an amplification degree is equal to or smaller than a stipulated value.

6. The computer-readable recording medium according to claim 5, wherein the computer program further causes the computer to execute detecting an offtrack amount indicating an amount of shift of a head of the storage apparatus from a center of a track of the storage medium, wherein the determining includes determining whether to rewrite the data to the storage medium based on the offtrack amount and the amplification degree.

* * * * *